Aug. 30, 1932.  A. L. HESTON  1,874,750
BIAS CUTTING MACHINE
Filed Aug. 22, 1931  3 Sheets-Sheet 1

Fig. 1.

INVENTOR
Allen L. Heston
BY
ATTORNEYS

Patented Aug. 30, 1932

1,874,750

UNITED STATES PATENT OFFICE

ALLEN L. HESTON, OF AKRON, OHIO, ASSIGNOR TO SEIBERLING RUBBER COMPANY, A CORPORATION OF DELAWARE

BIAS CUTTING MACHINE

Application filed August 22, 1931. Serial No. 558,667.

The present invention relates to improvements in machines for cutting fabric materials and is more particularly directed to means associated with the cutting element of such a machine for presenting the fabric to such element for the cutting operation.

An example of the type of machine with which the present invention can be advantageously used is shown and described in the application of Florian J. Shook for Bias Cutting and Fabric Stripping Machine, Serial No. 388,195, filed August 24, 1929. As there set forth, said machine is equipped with a horizontally disposed endless belt conveyor which is intermittently operated to advance the fabric sheet material (such as rubberized fabric used in tire manufacture), step by step and without tension, from a stock supply roll to a cutting position where it is cut diagonally by a rotary power-driven cutter. This cutter is mounted upon a carriage which is reciprocable on a frame or guide overlying the endless belt conveyor and extending transversely thereof at the desired angle, the frame being adjustable at will to vary the angle of the cut. The carriage is caused to reciprocate by power mechanism including a manually controlled clutch whereby the driving connection may be made or broken, as and when desired. At the cutting line, the fabric passes over a resilient metal strip or bar which is associated with the adjustable frame and which extends across the conveyor immediately above the upper surface thereof. This strip or bar facilitates the traversing movement of the cutter and protects the endless belt as well. A guide shoe is also mounted on the carriage and has a bifurcated portion straddling the lower edge of the cutter, this shoe being wedge-shaped and adapted to slide under the fabric with the aid of the resilient metal strip, and to lift the fabric against the cutter during the cutting stroke of the carriage. On the return stroke of the carriage, the guide shoe passes over the fabric, leaving the same free to be fed forwardly preparatory to the next cut. Means are also provided whereby the feeding movement of the conveyor is effected automatically during the return stroke of the carriage.

In the accompanying drawings, there is illustrated a preferred embodiment of the present invention, the same serving in connection with the description herein fully to explain the principles of the invention and to set forth its advantages. The invention is shown in connection with the bias cutting machine illustrated and described in the said Shook application. As the invention, however, is principally concerned only with the separator bar or cutter ribbon, as it will hereinafter be called, which facilitates the traversing movement of the cutter and protects the endless belt or conveyor, heretofore referred to, and to certain parts immediately associated therewith, only such portions of the said Shook machine will be described and illustrated herein as are necessary for a full and thorough understanding of the invention by those skilled in the art.

Referring to the drawings, there is shown therein a bias cutting machine which includes (see Fig. 2) a fixed main frame 10, having spaced parallel side rails 11 and supporting standards or legs 12, and a supplementary frame 13 which extends transversely over the main frame 10, and is adjustable angularly with reference thereto.

The supplementary frame 13 comprises mounting brackets 14 (Fig. 2), arranged one at each side of said main frame, and secured to the respective side rails 11, said brackets (Fig. 2) serving adjustably to support a pair of vertically spaced structural steel channel members 15 and 16, the former of which is spaced slightly above the main frame side rails, and the arrangement being such that the supplementary frame 13 is disposed diagonally or obliquely with reference to the main frame. The channel members 15 and 16 are connected together at their opposite ends, by spacing brackets 17 and 18, which (Fig. 2) respectively support sprocket wheels 19 and 20, the relations and functions of which will hereinafter be more fully described.

Supported above the main frame 10 by extensions 21 of the leg members 12 is a horizontal table 22 (see Fig. 1), having side rails 23. Arranged to travel over this table 22 is an endless belt conveyor 28 on which is carried the fabric, as a rubberized fabric sheet A, which is fed forwardly from a stock spool, not shown, to a cutting position below the supplementary frame 13. It is unnecessary further to illustrate or describe these feeding and conveying mechanisms, although incidental reference will be made to them.

Figure 1:
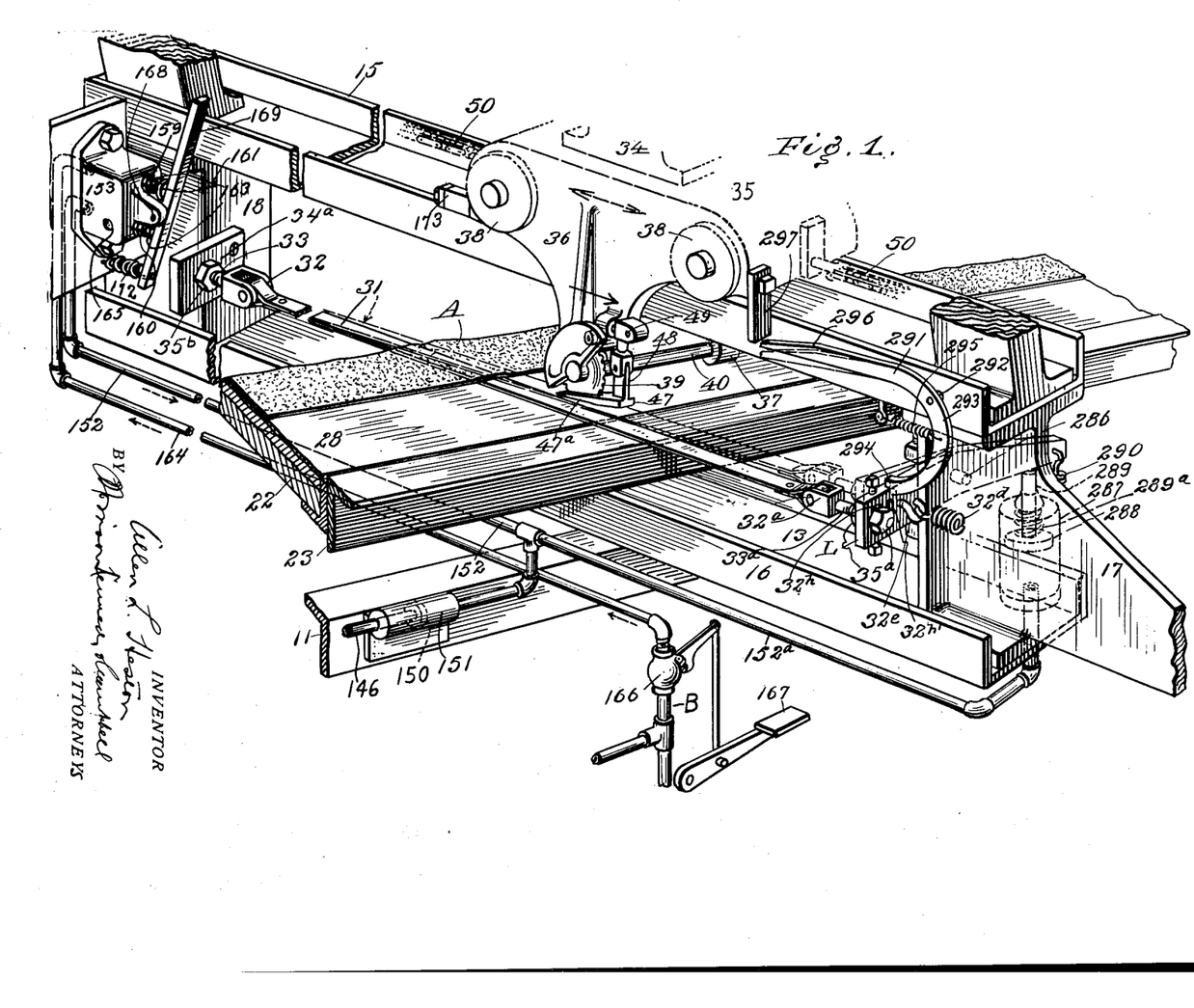
Fig. 1 is a perspective view, showing parts of a bias cutting machine equipped with a preferred embodiment of the invention.

As stated, the fabric sheet material to be cut lies upon the belt conveyor 28 and is fed without tension and, as it reaches the cutting position, it is caused to pass over a cutter ribbon 31 by which it is raised slightly from the conveyor belt (see Fig. 1). This cutter ribbon 31 is preferably in the nature of a thin, flat strip of resilient metal, which is slightly inclined in a transverse direction and extends entirely across the main frame in line with the channel bar 15. It is secured at one end by means of a screw yoke 32 to an extension plate 34ª on the spacing bracket 18, and at the other end to a lever L. Further reference will presently be made to this lever and cutter ribbon.

Mounted for reciprocation on the channel member 15 is a carriage 34, which comprises a substantially horizontal portion 35 and depending flange portions 36 and 37, respectively disposed at opposite sides of the channel member 15. Supporting wheels or rollers 38 are mounted on the inner faces of the flange portions 36 and 37 and bear on the upturned flanges at the longitudinal edges of the channel member 15 (see Fig. 1), thus facilitating movement of the carriage. In order to reciprocate the carriage 34, it is attached in any suitable manner to a link chain 50 (see Fig. 2), which runs over the bracket wheels 19 and 20, before referred to, the wheel 20 being secured to a shaft 51 which is journaled in the spacing bracket 18. Additional mechanism is provided by means of which the carriage 34 is reciprocated back and forth across the conveyor, making its cutting stroke as it moves away from the front or operator's side of the machine at the right in Figs. 1 and 2. This mechanism need not be further described nor shown, it being sufficient to say that the means for conveying the fabric across the table 22 to the cutting element, hereinafter to be described, and the means for reciprocating the carriage 34 back and forth across the table are synchronized in their operations so that the fabric will be presented to the cutting element at the proper times.

A rotary cutter 39 is secured to one end of a shaft 40, which is journaled in the lower ends of the flange portions 36 and 37 of the carriage 34, the shaft being driven by a belt and pulley arrangement 42 (see Fig. 2) from an electric motor 43 on the carriage portion 35. The rotary cutter 39 is preferably formed of a thin circular metallic disc, having its periphery sharpened to a knife edge and made with inwardly extending radial notches or incisions which form teeth. It has been found that a cutter of this character does not become gummed, and is therefore more effective than a plain circular cutter.

The cutter rotates in a plane directly over the cutter ribbon 31 and has associated with it a bifurcated wedge-shaped guide shoe 47 (see Fig. 1), which is adapted to slide under the fabric and raise the same against the edge of the cutter. The guide shoe 47 is suspended from the carriage by a bar 48, pivoted at 49, and the fork portions of the pointed bifurcated end of the shoe are disposed at opposite sides of the lower edge of the cutter. The guide shoe has its lower portion sole 47ª slightly inclined longitudinally with reference to the cutter ribbon 31, which, instead of being arranged strictly horizontally, is preferably disposed at a downward inclination from the near edge, i. e., the edge nearer the operator, to the far edge of the fabric. With the cutter ribbon thus downwardly inclined, it is not so important that the ribbon be of a resilient nature, although even so it is preferred to have the ribbon mounted for yielding at its near end in order that the guide shoe can more easily pass beneath the fabric.

It will be apparent that with the cutter, guide shoe, and cutter ribbon made and arranged, as heretofore described, the cutter ribbon being inclined as noted, the guide shoe during the cutting stroke will only contact with the cutter ribbon at the very beginning of the stroke, and the fabric, being raised above the guide shoe for proper presentation to the cutter, will also avoid contact with the cutter ribbon. Upon the completion of the cutting stroke, however, the immediate strip will have been severed from the fabric and the guide shoe thus released from its engagement with the fabric, which will drop to contact with the cutter ribbon. The width of the cutter ribbon 31 and its inclination from the horizontal, when in raised or high position, are so related that the fabric will be supported at its severed edge on the cutter ribbon, not only during the cutting stroke but also during the return stroke of the cutter. During such return stroke of the cutter, therefore, the guide shoe will pass above the body of the fabric which, as it continues its forward feeding movement to present a new strip for the cutting operation, will, as stated, contact directly with the cutter ribbon.

It will be observed that during the cutting stroke of the cutter inasmuch as the fabric is supported on the guide shoe, which passes beneath the fabric, and inasmuch as the fabric is for the time being at rest, there is nothing to disturb the fabric or interfere with the smooth and efficient cutting thereof. During the return stroke of the cutter, however, and as heretofore explained, the guide shoe is moved above the fabric and moreover is inclined downwardly, and it has been a common experience that, with the parts so arranged and operating, the guide shoe will interfere with the fabric in its forward feeding movement and prevent the proper cutting thereof into the desired strips. To avoid this interference, with its obvious and serious results, it is proposed according to the present invention to lower the cutter ribbon 31 to horizontal position at the beginning of the return stroke, and at the end thereof to raise it again back to its original inclined position. In carrying out the invention, means are provided whereby at the beginning of the cutting stroke the cutter ribbon will be lifted to inclined position from the near edge of the fabric to the far edge thereof, and in which position it will remain until the beginning of the return stroke, when it will be automatically shifted to horizontal position, there to remain until the beginning of the next cutting stroke, when it will be automatically shifted back again to the described inclined position. By thus timing the changing of positions of the cutter ribbon, the fabric will be raised from the cutter ribbon during the cutting stroke of the cutter, and during the return stroke thereof the fabric will pass over the cutter ribbon in actual contact therewith and free from any interference therewith by the cutter or its associated parts.

Briefly stated, the automatic means for so shifting the position of the cutter ribbon includes in its preferred form, and as herein shown, a horizontally disposed lever centrally pivoted on the supplementary frame of the cutter. To an end of the lever, adjacent the cutter ribbon, the near end of the latter is securely fastened, and the opposite or far end of the lever is connected to power means for rocking it upwardly and downwardly. This vertical rocking of the lever is so timed with relation to the movement of the cutter that the near end of the lever, i. e., the end to which the cutter ribbon is attached, is at the peak of its upward movement, when the cutter is in position to begin its cutting stroke, whereby the near end of the cutter ribbon will be raised and the ribbon thus caused to assume the desired inclined position from the near end to its far end. Furthermore, when the cutter has completed its operating or cutting stroke, the near end of the lever will have descended to its lowermost position, taking the near end of the cutter ribbon with it and thus restoring the cutter ribbon to horizontal position.

In the Shook machine heretofore referred to, and as fully described and illustrated in said application, there is provided an air pressure system for operating the conveyor element which feeds the fabric to the cutter, which description and illustration need not now be repeated.

It may here be said, however, that said system includes a cylinder 151 which is normally supplied with air through a pipe 152 which leads from an automatic control 153 at the opposite side of the machine. This automatic control 153, (best shown here in Fig. 5), comprises a box-like casing having internal partitions which define separate chambers 154, 155 and 156. A pair of poppet valves 157 and 158, mounted within the casing, permit or prevent communication between the chamber 155 and the chambers 154 and 156, said valves having stems 159 and 160, respectively, which extend outwardly from the casing and are fitted with enlarged heads 161 and 162, respectively, between which and the casing wall are compression springs 163. The pipe 152 leads into the chamber 155, while a similar pipe 164 leads into the chamber 154 from the main air supply pipe B. Normally, the valve 157 is closed and the valve 158 open, in which condition the chamber 155 is in communication with chamber 156 to permit venting through an opening 165 in the side of the casing. Supply of air to the pipe 164 is under control through the medium of a normally closed valve 166 which may be opened by depression of a pedal 167 at the operator's station (see Fig. 1).

Pivoted at 168 between the outer ends of the valve stems 159 and 160 is a lever 169 which is adapted to swing in the common plane of said valve stems and which is provided with rollers 170 and 171 adapted to bear against the respective head portions 161 and 162. The lower end of this lever 169 is connected with a tension spring 172 whereby the lever is held in a tilted position, as here indicated by full lines in Figs. 1 and 5, holding valve 158 open and permitting valve 157 to be closed by its spring 163. The upper end of the lever 169 is disposed in the path of movement of an adjustable stud 173 (see Figs. 1 and 2), which projects from one side of the carriage portion 35. Consequently, as the carriage reaches the end of its cutting stroke, the stud 173 will engage the upper end of lever 169 and rock the same about its pivot 168 to the position here shown by the dotted lines in Fig. 5. The valve 157 will then be opened and the valve 158 closed, permitting air to flow from chamber 154 through chamber 155 and out through pipe 152 to the cylinder 151. On the other hand, when the carriage starts its return stroke, the stud 173 breaks contact with the lever 169 and allows it to return to its original position to reverse the position of the two valves, and venting the cylinder 151 so as not to interfere with the subsequent operation of a rod 146 to which the piston 150 is attached and which connects with mechanism, not shown, by which the conveyor is actuated in its feeding movement of the fabric.

While other instrumentalities may be used to actuate the lever L for raising and lowering the cutter ribbon, in accordance with the invention, it is preferred, as part of the means for so actuating the lever, to make use of an air pressure system which is an extension of and is operated in combination with and in timed relation to the operation of the said air pressure system of the Shook device. Hence, in the embodiment of the invention illustrated, a pipe is provided which communicates with said system. Through this pipe the compressed air of the system is conveyed to a cylinder, housing a piston arranged to be raised by the compressed air. This piston has at its upper end a piston rod which contacts at its outer extremity with the far end of the lever, which is thus raised and with it the piston rod. A spring is connected to this end of the lever and retracts it to its former low position upon the exhaust of the air. As heretofore stated, the opposite or near end of the lever, and with it the near end of the cutter ribbon, will also be raised and lowered by the said opposite movements of the far end of the lever, and thus the cutter ribbon will be raised to inclined position and restored to horizontal position.

The supply of compressed air for thus raising the piston rod is controlled by an automatic control or valve element which operates to establish and shut off the flow of the compressed air, this being the same valve element which controls the flow of the compressed air to actuate the mechanism for feeding the fabric. At a point between this valve and the cylinder, the air supply pipe is connected to the said main air pressure system for operating the feeding element heretofore referred to. This connection, furthermore, is made in such manner that, when the compressed air is released from the automatic control or valve element, it passes not only into the pipe leading to the piston cylinder, but also into the said other or main air pressure system and causes the same to actuate the feeding element, the parts being so arranged that the operation of the feeding and cutting elements and the raising and lowering of the cutter ribbon will be properly relatively timed.

In detail the invention, as illustrated in the drawings, comprises a lever L centrally mounted on a pivot 286 to the upper part of the spacing support 17. The cutter ribbon 31 is mounted at its far end, i. e., the end remote from the operator, by means of a screw yoke 32 and screw bolt 33 to a plate $34^a$ mounted on the spacing support 18. Bolt heads $35^b$ are mounted on the bolt on opposite sides of the plate $34^a$ to prevent longitudinal movement of the screw bolt 33 which would permit slackening of the cutter ribbon 31. The opposite or near end of the cutter ribbon 31 is mounted, see Fig. 1, through screw yoke $32^a$ and screw bolt $33^a$ to the near end of the lever L, i. e., the end near the operator. The screw bolt $33^a$ passes through an elongated orifice $32^h$ (see Fig. 3) in the lever L, to which further reference will be made, and, in order to prevent slackening of the cutter ribbon, bolt heads $35^a$ are arranged on the screw bolt $33^a$, one at each side of the lever L. Further to prevent slackening of the cutter ribbon, the lever L is held against lateral movement by means of a spring $32^d$ screwed at one end to an eye-bolt $32^e$ fastened to the lever L, and at the other end (see Fig. 4) to another eye-bolt $32^f$ fastened to the support 17.

Figures 3, 4, 5:
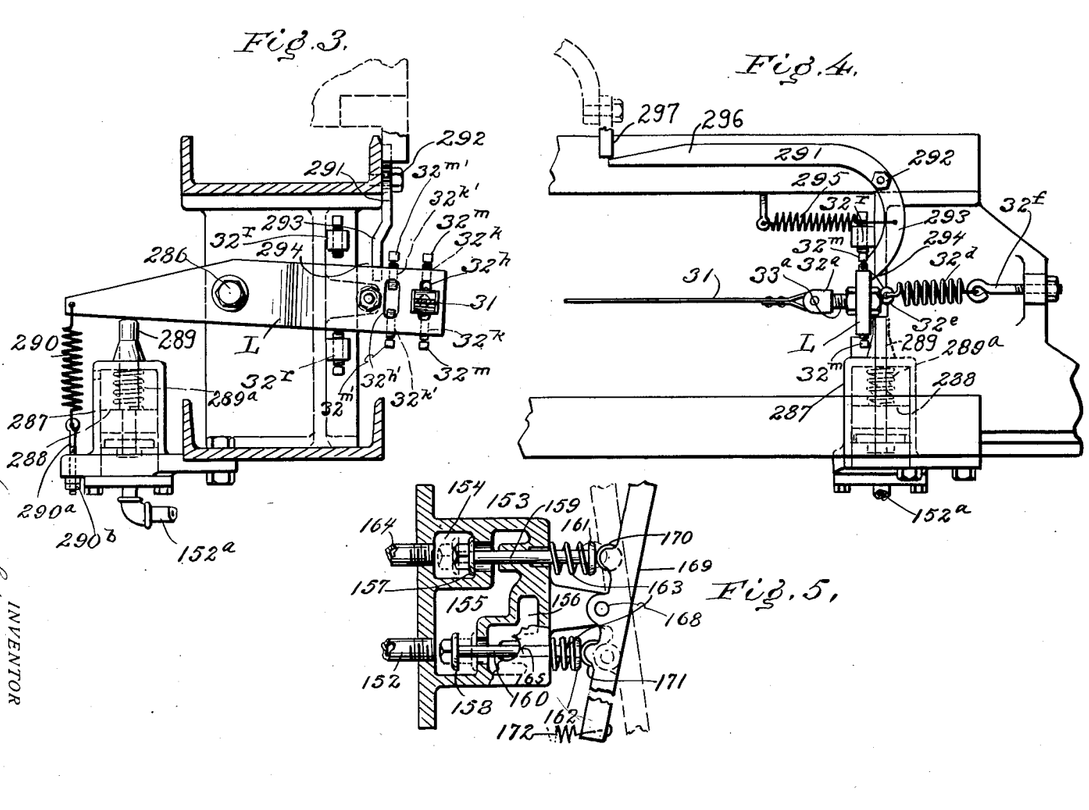
Fig. 3 is a transverse section, taken on the line 3—3 of Fig. 2 and looking in the direction of the arrow.
Fig. 4 is a fragmentary transverse view.
Fig. 5 is a detail view, partly in section, of a carriage controlled master valve for automatically operating certain mechanism connected with the cutter ribbon.

Means are provided for regulating at will the degree of inclination of the cutter ribbon 31. For this purpose (see Fig. 3), the lever L is formed with upper and lower vertical threaded apertures $32^k$ leading into the elongated orifice $32^h$, one of said apertures extending from the bottom edge of the lever and the other from the top edge thereof. In these apertures are arranged screw bolts $32^m$, the inner ends of which project into the apertures and abut against the screw bolt $33^a$ and thus hold the latter from vertical movement. It will be seen that, by raising and lowering the bolt $33^a$ in the orifice $32^h$, the inclination of the cutter ribbon 31 will be changed in similar degree and the change of position of the bolt $33^a$ will be permitted by proper and obvious vertical manipulation of the screw bolts $32^m$. As also shown in Fig. 3, the lever L is formed with another orifice $32^{h'}$, similar to and located somewhat to the left of the orifice $32^h$ and into which lead apertures $32^{k'}$. A rod, not shown, underlies the conveyor belt 28 and holds the belt in a definite relation to the cutter ribbon 31, as the belt and fabric move forward. This rod follows the path of the cutter ribbon, being properly secured at both ends, the near end passing thru the orifice $32^{h'}$, and being secured to the lever L in the same manner as the cutter ribbon rod $33^a$. Likewise bolts $32^{m'}$ are fitted in the apertures $32^{k'}$ by which the vertical position of the rod in the orifice $32^{h'}$ may be controlled so that it may maintain the conveyor belt in its definite relation to the cutter ribbon 31. Bolts 32$^r$, as shown in Fig. 3, are provided to limit the vertical movement of the lever L.

For raising the far end of the lever L and thus lowering the cutter ribbon 31 to horizontal position, as heretofore described, a cylinder 287 is provided, see Fig. 1, which is secured to the frame at a convenient point beneath said far end of the lever L. A piston 288 is slidably arranged within the cylinder; and projecting from the upper side of this piston is a plunger or piston rod 289 (see Fig. 1) of suitable length so that its outer end contacts with the adjacent or far end of the lever L. On the upward stroke of the piston rod 289, effected by the compressed air admitted to the cylinder 287, and against the force of a coil spring 289$^a$ engaging the piston rod 289 within the cylinder 287, as will presently be described, the far end of the lever L is raised and the opposite or near end thereof is lowered, the length and upward stroke of the piston rod being regulated so that the near end of the lever L, which is connected to the near end of the cutter ribbon 31, will be lowered the proper distance to bring the cutter ribbon 31 to normal horizontal position, as shown in Fig. 1.

A latch 291 is conveniently pivoted as at 292, on one of the journal members 15 (see Fig. 1) above the lever L, and has a depending curved arm 293 with a notched end 294 adapted to engage the upper edge of the lever L, when the latter is in its low position, as shown in Fig. 1. This engagement is brought about by the pull of a spring 295 fastened at one end to the arm 293 of the latch and at its other end to the channel member 15 of the machine. Normally, this spring keeps the notched end 294 in contact with the side of the lever L so that, when the near end of the lever tilts to its low position, the notched end 294 of the latch 291 will slip over and engage with the upper edge of the lever. The latch 291 has an upper horizontally extending arm 296 whose end is wedge-shaped, as shown in Fig. 1, whereby, when the cutter carriage 35 approaches the end of its return stroke, a lug 297 carried on said carriage will ride upon the wedge-shaped end of the latch arm 296 and lower the same, thus tripping or releasing the notched end 294 from the near end of the lever L and permitting the latter to be raised to its high position in a manner now to be described. When the notched end 294 is so released from the lever L and the compressed air is exhausted from the cylinder 287, to which further reference will be made, the far end of the lever L will be pulled down by a spring 290 (see Figs. 1 and 3) suitably secured to said end of the lever and to the frame of the machine and by the retraction of the spring 289$^a$ which operates in parallelism with the spring 290. The spring 290 is made adjustable by means of the screw eye 290$^a$ and nut 290$^b$ engaging the frame, so as to insure at all times prompt and reliable action. This downward movement of the far end of the lever will tilt the near end thereof to its high position, whereby the near end of the cutter ribbon 31 will be raised and the entire ribbon thus caused to slant at the desired inclination from its near end to its far end, all as shown in dotted lines in Fig. 1.

Referring again to the supply of compressed air for the upward stroke of the piston rod 289, it will be noted that, when the carriage 35 starts on its return stroke, as heretofore described in detail, and the compressed air is admitted by the automatic control 153 to the pipe 152 leading into the cylinder 151 in order to actuate the piston rod 146, sufficient of the compressed air will pass through a branch extension 152$^a$ of said pipe 152, provided in accordance with the invention, to the cylinder 287 and impel upwardly the piston 288 and its piston rod 289, thus raising the far end of the lever L to its high position, as shown in Fig. 1, and correspondingly lowering the opposite or near end of the lever L and with it the cutter ribbon 31, as heretofore described. It will be further observed that, as stated, the charge of compressed air thus acts on the piston rod 146 to actuate the conveyor on its feeding movement of the fabric and simultaneously acts on the piston rod 289 to actuate the mechanism for lowering the cutter ribbon 31 to horizontal position, thus synchronizing the operations of these two mechanisms, as desired.

Figure 2:
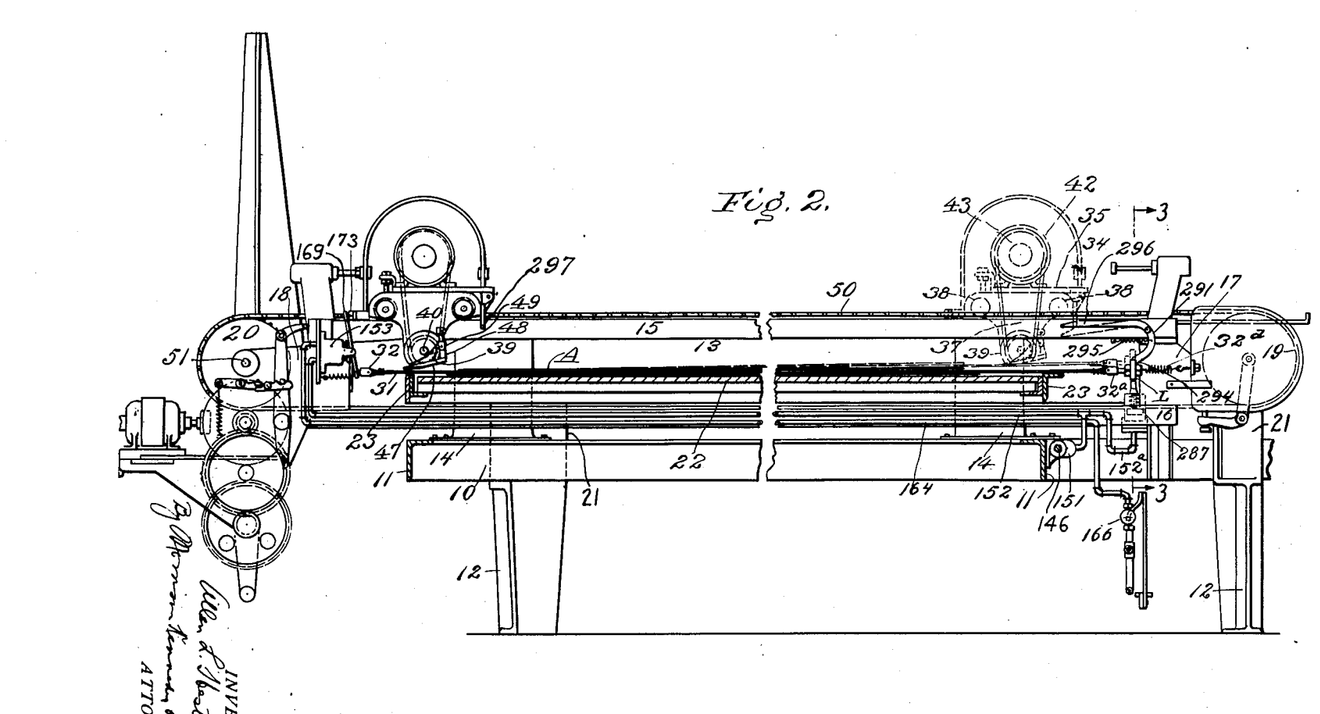
Fig. 2 is a transverse sectional view of the same machine and embodiment illustrated in Fig. 1.

The simplicity and efficiency of the invention will be further demonstrated upon considering the operation of the means for raising the cutter ribbon to high position, as shown in dotted lines in Fig. 1. When the cutter carriage 35 has about completed its return stroke and is ready to begin its cutting stroke, the charge of compressed air received from the automatic control 153 for actuating the conveyor and lowering the cutter ribbon will have been spent and the latch 293 will have been released from its locking engagement with the near end of the lever L. The actions of the springs 289$^a$ and 290 will now be effective to draw down the far end of the lever L, thus raising the opposite or near end of the lever and with it the near end of the cutter ribbon 31. The excess air forced from the cylinder 287 and through the pipes 152$^a$ and 152 by the downward stroke of the piston 288 will be exhausted through the vent 165 in the side of the automatic control 153 and communicating with the chamber 156. Meanwhile, the conveying mechanism will have completed the feeding movement of the fabric and presented another sheet for the cutting operation. The valves in the automatic control 153 will retain their instant positions, viz., the valve 157 in closed position and the valve 158 in open position, and the cutter ribbon 31 will maintain its inclined position until the carriage 35 has completed its cutting stroke and the lug 173 carried by the carriage has again contacted with the lever 169 and forced the same to the position shown in Fig. 2, whereby the valves in the automatic control 153 will reverse their positions, valve 157 assuming open position and valve 158 closed position, which positions of the respective valves will permit another charge of compressed air to enter the automatic control 153 through the pipe 164. As the carriage 35 begins its return stroke immediately, the lever 169 is also released immediately and allowed to resume its normal position, as shown in Figs. 1 and 2, the force of the compressed air, now entering the automatic control through the pipe 164, aiding the spring 172 to bring about this change of position of the lever and with it of the valves in the automatic control. The charge of compressed air so permitted to pass through the automatic control and through the pipe 152 and its extension 152ª is thus only sufficient properly to actuate the pistons 150 and 288 and through them the conveying mechanism for feeding the fabric and the lever for lowering the cutter ribbon 31, which operations will be synchronized, as has been fully set forth. This charge of compressed air will remain in the automatic control until the carriage 35 again begins its return stroke, when the lever 169 will be released and the positions of the valves reversed to former positions, as heretofore described, permitting the charge of compressed air to flow through the pipe 152 and its extension 152ª again to actuate the pistons 150 and 289 and through them the conveying mechanism for feeding the fabric and the lever for lowering the cutter ribbon, which operations will be synchronized, as has also been fully set forth.

The operation of the device will be fully understood from the foregoing description. Regarding the supply of compressed air, however, it should be said that the valve 166 is preferably so arranged that, once the valve has been opened, it will remain in open position for any desired length of time, the charges of compressed air admitted to the pipe 152 and its branch extension 152ª for the actuation of the conveying means and the means for lowering the cutter ribbon 31, respectively, being regulated by the automatic control 153, as hereinbefore explained.

In its broader aspects the invention is not confined to the specific construction shown and described, nor to any construction by which the same has been carried into effect, as many changes may be made in the details thereof without departing from the spirit of the invention or sacrificing its chief advantages.

Having thus described my invention, what I claim is:

1. In a fabric cutting machine, the combination with a conveyor for feeding the fabric, a cutter arranged to traverse the fabric in a cutting stroke, and a cutter ribbon for separating the fabric from the conveyor, of means for automatically raising and lowering said cutter ribbon in timed relation to the operation of the cutter.

2. In a fabric cutting machine, the combination with a conveyor for feeding the fabric, a reciprocating cutter arranged to traverse the fabric in a cutting stroke and a return stroke, and a cutter ribbon for separating the fabric from the conveyor, of means for automatically raising and lowering said cutter ribbon in timed relation to the operation of the cutter.

3. In a fabric cutting machine, the combination with a conveyor for feeding the fabric, a reciprocating cutter arranged to traverse the fabric in a cutting stroke and a return stroke, and a cutter ribbon for separating the fabric from the conveyor, said cutter ribbon being normally arranged in a lowered position during said return stroke of the cutter, of means for automatically raising the near end of said cutter ribbon at the beginning of the cutting stroke.

4. In a fabric cutting machine, the combination with a conveyor for feeding the fabric, a reciprocating cutter arranged to traverse the fabric in a cutting stroke and a return stroke, and a cutter ribbon for separating the fabric from the conveyor, of means for raising said cutter ribbon to an inclined position at the beginning of the cutting stroke, and fluid pressure-actuated means for lowering said cutter ribbon from such inclined position at the end of the cutting stroke.

5. In a fabric cutting machine, the combination with a conveyor for feeding the fabric, a reciprocating cutter arranged to traverse the fabric in a cutting stroke and a return stroke, and a cutter ribbon for separating the fabric from the conveyor, of spring actuated means for automatically raising said cutter ribbon to an inclined position at the beginning of the cutting stroke, and means for lowering said cutter ribbon from such inclined position at the end of the cutting stroke.

6. In a fabric cutting machine, the combination with a conveyor for feeding the fabric, a reciprocating cutter arranged to traverse the fabric in a cutting stroke and a return stroke, and a cutter ribbon for separating the fabric from the conveyor, of spring actuated means for raising said cutter ribbon to an inclined position at the beginning of the cutting stroke, and fluid pressure actuated means for lowering said cutter ribbon from such inclined position at the end of the cutting stroke.

7. In a fabric cutting machine, the combination with a conveyor for feeding the fabric, a reciprocating cutter arranged to traverse the fabric in a cutting stroke and a return stroke, and a cutter ribbon for separating the fabric from the conveyor, of means for holding said cutter ribbon in an inclined position during the cutting stroke of the cutter, and means for holding said cutter ribbon in a lowered position during the return stroke of the cutter.

8. In a fabric cutting machine, the combination with a conveyor for feeding the fabric, a reciprocating cutter arranged to traverse the fabric in a cutting stroke and a return stroke, and a cutter ribbon for separating the fabric from the conveyor, said cutter ribbon being adapted to lie in horizontal or inclined positions, of spring actuated means for raising said cutter ribbon to inclined position at the end of the return stroke of the cutter, and fluid pressure actuated means for lowering said cutter ribbon to horizontal position at the end of the cutting stroke.

9. In a fabric cutting machine, the combination with a conveyor for feeding the fabric, a reciprocating cutter arranged to traverse the fabric in a cutting stroke and a return stroke, and a cutter ribbon for separating the fabric from the conveyor, said cutter ribbon being adapted to lie in horizontal or inclined positions, of means for raising said cutter ribbon to inclined position at the end of the return stroke of the cutter, and means for lowering the said cutter ribbon to horizontal position at the end of the cutting stroke.

10. In a fabric cutting machine, the combination with a conveyor for feeding the fabric, a reciprocating cutter arranged to traverse the fabric in a cutting stroke and a return stroke, said conveyor being arranged to operate during the return stroke of the cutter, and a cutter ribbon for separating the fabric from the conveyor, of means for automatically raising and lowering an end of said cutter ribbon, said means being arranged to raise the end of the cutter ribbon at the beginning of the cutting stroke and lowering the same at the end of said stroke.

11. In a fabric cutting machine, the combination with a conveyor for feeding the fabric, a reciprocating cutter arranged to traverse the fabric in a cutting stroke and a return stroke, said conveyor being arranged to operate during the return stroke of the cutter, and a cutter ribbon for separating the fabric from the conveyor, of means for automatically raising and lowering the near end of said cutter ribbon, said means being actuated by the cutter at the end of the cutting stroke to lower said end of the cutter ribbon.

12. In a fabric cutting machine, the combination with a conveyor for feeding the fabric, a reciprocating cutter arranged to traverse the fabric in a cutting stroke and a return stroke, said conveyor being arranged to operate during the return stroke of the cutter, and a cutter ribbon for separating the fabric from the conveyor, of means for automatically raising and lowering the near end of said cutter ribbon, said means being actuated by the cutter at the end of the return stroke to raise said end of the cutter ribbon.

13. In a fabric cutting machine, the combination with a conveyor for feeding the fabric, a reciprocating cutter arranged to traverse the fabric in a cutting stroke and a return stroke, said conveyor being arranged to operate during the return stroke of the cutter, and a cutter ribbon for separating the fabric from the conveyor, of means for automatically raising and lowering the near end of said cutter ribbon, said means being actuated by the cutter at the end of the cutting stroke to lower said end of the cutter ribbon, and actuated by the cutter at the end of the return stroke to raise said end of the cutter ribbon.

14. In a fabric cutting machine, the combination with a conveyor for feeding the fabric, a reciprocating cutter arranged to traverse the fabric in a cutting stroke and a return stroke, and a cutter ribbon for separating the fabric from the conveyor, of means for raising the near end of said cutter ribbon, means for lowering said end, and a compressed air system for actuating said conveyor and said lowering means, said system including a valve element for controlling the supply of air and being arranged to admit a supply of compressed air at the end of the cutting stroke for actuating said conveyor and lowering means.

15. In a fabric cutting machine, the combination with a conveyor for feeding the fabric, a reciprocating cutter arranged to traverse the fabric in a cutting stroke and a return stroke, and a cutter ribbon for separating the fabric from the conveyor, of means for raising and lowering the near end of said cutter ribbon, said means comprising a centrally pivoted rocking lever to one end of which the near end of said cutter ribbon is attached, and a pneumatically operated piston rod and an anchored spring operative upon the opposite end of the lever, said parts being so arranged that the near end of the cutter ribbon will be lowered by the piston rod and raised by the spring.

16. In a fabric cutting machine, the combination with a conveyor for feeding the fabric, a reciprocating cutter arranged to traverse the fabric in a cutting stroke and a return stroke, and a cutter ribbon for separating the fabric from the conveyor, of means for raising and lowering the near end of said cutter ribbon, said means comprising a centrally pivoted rocking lever to one end of which the near end of said cutter ribbon is attached, a spring attached to the opposite end of said lever and acting to depress said end and raise the cutter ribbon, a fluid-actuated piston operative upon the spring-attached-end of the lever to raise it and lower the cutter ribbon, a detent cooperating with the lever to hold the cutter ribbon lowered, means actuated by the cutter at the end of its cutting stroke for energizing the fluid-actuated piston, and means actuated by the cutter at the end of its return stroke for disengaging the detent from the lever.

17. In a fabric cutting machine, the combination with a conveyor for feeding the fabric, a reciprocating cutter arranged to traverse the fabric in a cutting stroke and a return stroke, and a cutter ribbon for separating the fabric from the conveyor, said cutter ribbon being adapted to lie in horizontal or inclined positions, of means for automatically raising said cutter ribbon to inclined position, and means for regulating the degree of inclination of the cutter ribbon.

18. In a fabric cutting machine, the combination with a conveyor for feeding the fabric, a cutter arranged to traverse the fabric in a bias cutting stroke, and a cutter ribbon for separating the fabric from the conveyor and arranged in the plane of the bias cutting stroke, of means for varying the angular position of the cutter ribbon with relation to the fabric.

19. In a fabric cutting machine, the combination with a conveyor for feeding the fabric, a cutter arranged to traverse the fabric in a cutting stroke, a cutter ribbon for separating the fabric from the conveyor, and means for raising and lowering the cutter ribbon at the near end of the fabric to facilitate the cutting operation.

20. In a fabric cutting machine, the combination with a conveyor for feeding the fabric, a cutter arranged to traverse the fabric in a cutting stroke, a cutter ribbon for separating the fabric from the conveyor, means actuated by the cutter for lowering the near end of the cutter ribbon at the end of the cutting stroke, and means actuated by the cutter for raising the near end of the cutter ribbon at the end of its return stroke.

In testimony whereof, this specification has been duly signed by:

ALLEN L. HESTON.